United States Patent [19]

Allen et al.

[11] Patent Number: 4,497,494
[45] Date of Patent: Feb. 5, 1985

[54] PRESSURE ACTIVATED SEAL RING

[75] Inventors: Karl D. Allen, Canton; Alan L. Brace, Livonia, both of Mich.

[73] Assignee: General Motors Corporation, Detroit, Mich.

[21] Appl. No.: 598,421

[22] Filed: Apr. 9, 1984

[51] Int. Cl.³ .................... F16J 15/24; F16J 15/46
[52] U.S. Cl. ............................ 277/27; 277/165; 277/215
[58] Field of Search ............... 277/3, 27, 29, 59, 70, 277/165, 177, 201, 213, 214, 207 R, 215; 192/85 R

[56] References Cited

U.S. PATENT DOCUMENTS

| | | | |
|---|---|---|---|
| 1,499,571 | 7/1924 | Davis | 277/215 |
| 2,226,921 | 12/1940 | Chamberlain | 277/215 |
| 3,525,530 | 8/1970 | Bauer et al. | 277/165 |
| 3,836,216 | 9/1974 | Junker | 277/27 X |
| 4,123,068 | 10/1978 | Van Gorder | 277/27 |
| 4,165,079 | 8/1979 | Clements | 277/27 X |

*Primary Examiner*—Robert S. Ward
*Attorney, Agent, or Firm*—Donald F. Scherer

[57] ABSTRACT

A pressure activated seal ring has an inner cylindrical surface with a plurality of undulations formed thereon and a substantially smooth cylindrical outer surface. The undulated areas permit pressure on the inner surface so that the outer cylindrical surface will be forced into sealing contact with an adjacent surface.

2 Claims, 4 Drawing Figures

PRESSURE ACTIVATED SEAL RING

This invention relates to seal rings and more particularly to seal rings which respond to pressure on an inner cylindrical surface to enforce sealing engagement at an outer cylindrical surface.

Prior art pressure activated seal rings have smooth inner and outer cylindrical surfaces. It is possible during operation of such seal rings, that fluid flow passing the outer cylindrical surface will force the sealing ring inwardly. The smooth inner cylindrical surface will seal in a groove bottom thus preventing an immediate outward pressure force from developing on the inner surface. Such seal rings result in relative high fluid leakage in a hydraulic control system.

The present invention overcomes this disadvantage by providing an undulating inner cylindrical surface for the pressure activated seal ring. With the present invention, the seal ring can initially permit some fluid leakage across the outer cylindrical surface. However, such leakage, of necessity, is accompanied by a pressure drop. With the inner surface being undulated, static fluid pressure can act upon the inner surface and thereby overcome the pressure acting on the outer surface to force the seal ring into sealing engagement at the outer surface.

It is an object of this invention to provide an improved pressure active seal ring having an outer cylindrical seal surface and an inner cylindrical seal surface wherein undulations in one of the seal surfaces prevents sealing at that seal surface and simultaneously permits access of pressurized fluid to act thereon, thereby enforcing movement of the seal ring to seal at the other seal surface.

It is another object of this invention to provide an improved pressure active seal ring having an outer cylindrical seal surface and an undulated inner pressure activated surface wherein the undulations prevent sealing at the inner surface and simultaneously permit access of pressurized fluid to act thereon thereby enforcing outward movement of the seal ring.

This and other objects and advantages of the present invention will be more apparent from the following description and drawings in which.

Figure 1:
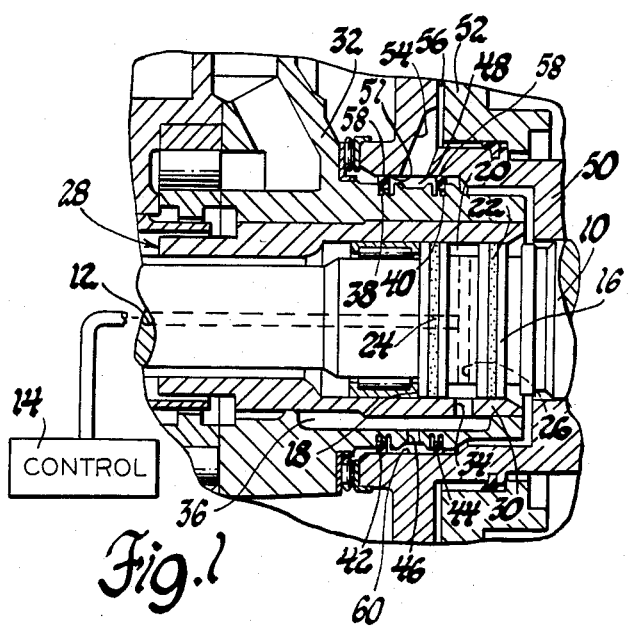
FIG. 1 is a cross-sectional elevational view of a portion of a hydraulic flow system.

Referring to the drawings, wherein like characters represent the same or corresponding parts throughout the several views, there is seen in FIG. 1 a portion of a power transmission having the hydraulic fluid flow circuit disposed therein. The mechanism shown in FIG. 1 includes a rotary shaft member 10 having a centrally disposed fluid passage 12 which is connected to receive fluid from a conventional hydraulic control mechanism 14. The shaft 10 has a pair of annular protuberances 16 and 18 which cooperates to form an annular hydraulic fluid chamber 20. The protuberances 16 and 18 each have disposed therein respective seal rings 22 and 24. The chamber 20 is in fluid communication with passage 12 through a radially extending passage 26 formed in the shaft 10. The seal rings 22 and 24 are in abutting sealing relationship with a housing assembly 28 which includes a sleeve 30 and a clutch housing support 32. The sleeve 30 has at least one passage 34 which communicates fluid between annular chamber 20 and a pressure chamber 36 formed in the clutch housing support 32.

The clutch housing support 32 has formed therein a pair of annular grooves 38 and 40 in which grooves are disposed pressure activated seal rings 42 and 44, respectively. The clutch housing support 32 has formed therein a passage 46 which communicates fluid from chamber 36 to an annular fluid chamber 48 disposed between the seal rings 42 and 44.

Drivingly connected to the shaft 10 and rotatably disposed about the support 32 is a clutch housing 50. The clutch housing 50 has slidable disposed therein a pressure actuated clutch piston 52. The assembly, structure and operation of such clutch pistons is well-known, therefore a more detailed description thereof is not believed necessary as those skilled in the art will be familiar with such devices. The clutch housing 50 has a bore 51 which cooperates with the seal rings 42 and 44 to enclose the annular fluid chamber 48. The clutch housing 50 has a fluid passage 54 formed therein which passage 54 is in fluid communication with the annular chamber 48 and a clutch control chamber 56.

Figure 3:
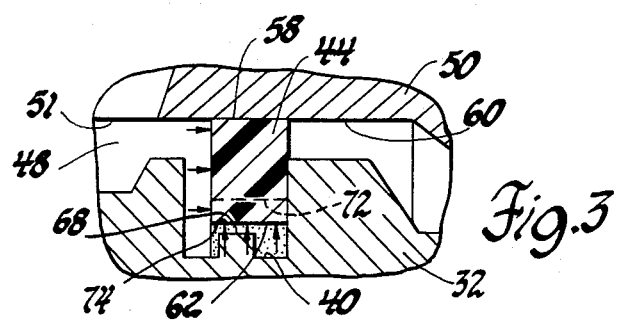
FIG. 3 is an enlarged view of the same portion of FIG. 1 showing the present invention.
Figure 4:
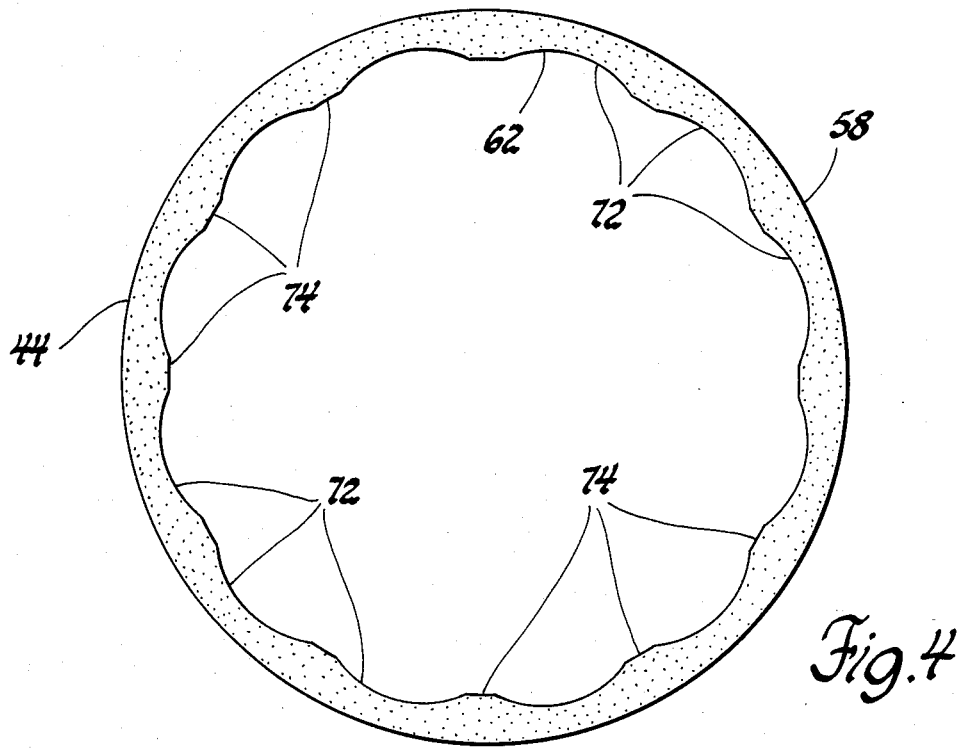
FIG. 4 is an elevational view of a seal ring incorporating the present invention.

When it is desirable to activate the piston 52, the clutch control chamber 56 is pressurized by admitting pressurized fluid to passage 12 from control 14. To ensure constant and efficient operation of the clutch piston 52, it is desirable to maintain fluid leakage within the hydraulic fluid flow path to a minimum. To this end, the seal rings 44 and 42 must be forced into sealing abutment between the outer cylindrical surface 58 of the seal ring and an inner cylindrical seal surface 60 on bore 51 of the clutch housing 50. Such a sealing arrangement is shown in FIG. 3. When such sealing arrangement occurs, the fluid pressure in the annular chamber 48 will operate on an inner cylindrical surface 62 of the seal ring 44 to ensure the sealing contact.

Figure 2:
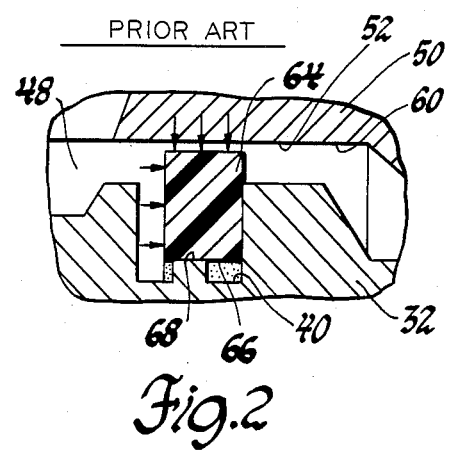
FIG. 2 is an enlarged portion of FIG. 1 showing the prior art.

With prior art seal rings, such as 64 shown in FIG. 2, it is possible for the inner cylindrical surface 66 to seal against an annular cylindrical surface 68 formed in the groove 40. When this occurs, the fluid in chamber 48 will flow axially outward across the outer cylindrical surface of the prior art sealing ring 64, imposing a pressure force thereon which will maintain the prior art seal ring 64 inwardly. This fluid leakage is detrimental to the efficiency and consistency of the clutch operating system.

In contrast, as seen in FIG. 3, the present invention permits the seal 44 to be forced outwardly into the desired sealing engagement. This is accomplished, as seen in FIG. 3, by providing the seal ring 44 with inner surface 62 which has undulations or scallops 72 formed thereon. Intermediate the scallops 72 are cylindrical surfaces 74 which will abut the inner surface 68 of groove 40 should the seal ring for some reason be compressed into the groove 40. However, upon pressurizing of annular fluid chamber 48, the fluid pressure will be directed into the scalloped or undulating portions 72 to act radially outward on the inner surface 62 of seal ring 44. Since the pressure acting on the inner surface is a static pressure, it will be at a pressure level equal to the pressure in annular chamber 48 while any pressure acting on the outer surface 58 will be a reduced pressure due to the dynamic character of the fluid as it flows across the outer surface 58. As is well known, the static pressure will be at a higher level than the dynamic pressure such that the outward force acting on seal ring 44 will be greater than the inward force thereby urging the seal ring 44 into sealing engagement with the surface 60 of clutch housing 50. This sealing engagement will occur substantially simultaneously with the initial pressure increase in annular chamber 48 prior to any significant pressure increase acting on clutch piston 52. Therefore, the piston actuation will be consistent and the hydraulic efficiency of the circuit is greatly improved.

While the above description of the preferred embodiment describes the seal as being pressure activated from the inner radius outwardly, it will be obvious to those skilled in the art that the undulations or interruptions in the one surface can be provided in the outer surface such that sealing will be enforced on the radially inner surface. It should be equally obvious to those skilled in the art that the above described invention can be utilized in linearly movable structures such as piston and cylinder arrangements.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An improvement in pressure activated seal rings, having inner and outer cylindrical surfaces, for use on relatively moveable components, one of which has a bore the other of which has a shaft, with a seal groove disposed in one of said components, said seal being used in a hydraulic system wherein fluid pressure is applied to one radial face of the seal and to one of the cylindrical surfaces of said seal whereby said seal is urged radially against one of said components and axially against one sidewall of said groove wherein the improvement comprises: one of said cylindrical surfaces of said seal having formed therein a plurality of undulations to permit said fluid pressure to act on said one cylindrical surface when said seal is pressurized to thereby ensure radial movement of said seal ring to seal against one of said components.

2. An improvement in pressure activated seal rings for use on rotating shafts which are disposed in a bore, said shaft including a groove with sidewalls for housing said seal member, said seal being used in a hydraulic system wherein fluid pressure is applied to one radial face of the seal and to the inner cylindrical surface of said seal whereby said seal is urged outward against said bore and axially against one sidewall of said groove wherein the improvment co prises: said cylindrical radially inner surface of said seal having formed therein a plurality of undulations to permit said fluid pressure to act on said radially inner surface when said seal is compressed radially inward to thereby ensure radially outward extension of said seal ring to seal against said bore.

* * * * *